May 26, 1936.  D. MacBRIDE  2,042,013

FAST FREEZING APPARATUS

Filed Jan. 8, 1935

Inventor
Duncan MacBride
by [signature] Atty.

Patented May 26, 1936

2,042,013

UNITED STATES PATENT OFFICE 2,042,013

FAST FREEZING APPARATUS

Duncan MacBride, Oak Bay, British Columbia, Canada

Application January 8, 1935, Serial No. 911

6 Claims. (Cl. 62—104)

This invention relates to apparatus for fast freezing of fish, animal or other products without direct contact of the product with the refrigerant. When such products are frozen, for preservation, crystals are formed throughout, and it is known that the formation of large crystals breaks down the cells of the product causing the juices to run out when thawing takes place and also otherwise spoiling the quality and flavor. It is also known that the speed of freezing from thirty degrees down to twenty degrees Farh. controls the size of crystals that will be formed, a fast temperature drop being productive of small crystal size.

With the usual method of freezing a certain common food product by storing it in a cold atmosphere it will require eighteen to twenty-four hours to obtain a drop in the temperature from the initial to the final temperature. The objects of my invention are, first, to obtain this temperature drop in one-quarter of this time.

In another method of fast freezing, the product is immersed directly in the refrigerant, usually brine. The brine however is absorbed to a certain extent and spoils the flavor and freshness. The second object of my improvement is to protect the product from all direct contact with the refrigerant. It is in contact on two opposite sides with a metal container. The outer surface of the container is in direct contact with flowing refrigerant. It is known that liquid in motion will absorb heat at a faster rate from a warmer substance it is in contact with than will the liquid at rest. With the two-sided heat extracting contact the product freezes from both sides towards the centre.

The third object is to make the apparatus in compact form, economical in construction and convenient for loading and discharging the product. This is vital for economy in operation. A convenient number of the containers are superimposed in a vertically adjustable frame to hold the bottom of each container slightly clear of the top of the cover of the container directly underneath, and means are provided for expeditious charging and discharging the product. The frame is of such form that the individual containers can be pulled out in the same manner as a drawer in a chest of drawers.

Figure 1:
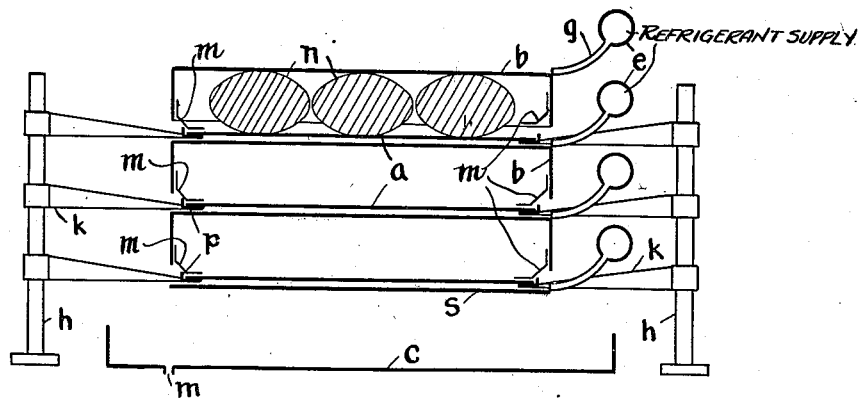
Figure 2:
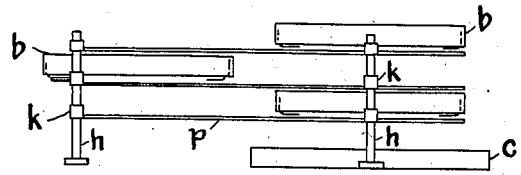

I attain these objects by the arrangement of parts illustrated in the accompanying drawing, in which, Fig. 1 is an end view vertical section, showing the top container charged with the product; Fig. 2 is a side elevation with the centre container out for charging or discharge.

Similar letters refer to similar parts throughout the two views.

The flat metal plates "$a$" serve to support the product, and "$b$" are loosely fitting flat metal covers for the plates, with four right angled sides. The plate with the cover in place compose the container. Any manner of convenient guides $m$ fastened to each plate hold the cover in alignment with the plate. The product to be frozen $n$, which is represented as the cross-section of a fish, when placed in the container is contacted on the bottom side by the plate and on the top side by the loosely fitting cover. The overhanging sides of the cover prevent the entry of liquid refrigerant from above.

A convenient number of such filled containers are disposed in a vertical position with regard to each other. The catch pan or sump $c$ collects the refrigerant. The sump drain openings $m$ leads to the refrigerant pump for recirculation. The frames $h$ have vertically adjustable arms $k$ which support each next upper pan in order and can be adjusted to provide a small horizontal space between the bottom of the plate supported and the top of the cover of the container immediately underneath. The refrigerant conducting pipes $e$ have adjustable refrigerant conductors $g$ to carry the pre-cooled liquid refrigerant to the top and bottom outside surface of each container. The refrigerant flows between the containers in contact with the cover of the lower container and the bottom of the upper plate, and down the sides giving complete surface contact without any direct contact of the refrigerant with the product. The plate $s$ acts as a baffle causing the refrigerant to flow in contact with the bottom of the bottom plate. The slides $p$ are attached to the adjustable arms $k$ and provide a support for the containers to slide upon when brought into position for charging or discharging.

In commercial operation any convenient number of these vertical packs can be arranged inside an insulated retort. The process can be made continuous by providing trucks or transmission apparatus to carry the filled containers in batches through the insulated retort at the desired speed to complete the freezing.

I am aware that prior to my invention freezing apparatus has been made with metal containers in contact with refrigerant. I therefor do not claim such a combination broadly, but—

I claim:

1. A fast freezing apparatus consisting of multiple drip-proof heat conducting containers made in two parts, a frame with vertically adjustable arms to support the said containers in a vertical position with relation to each other, horizontal guides attached to the said arms in pairs, refrigerant supply ducts and adjustable refrigerant conductors leading from the said ducts to the horizontal surfaces of said containers, substantially as set forth.

2. In a fast freezing apparatus, a plurality of superimposed refrigerating chambers, each including a plate and a loose cover overlying the plate and extending in all directions beyond the plate, the plate of one chamber overlying and spaced from the cover of the next lower chamber, and means for directing a refrigerant in the space between the plate of one chamber and the cover of the next lower chamber to thereby contact the plate of one chamber and the cover of the next lower chamber.

3. In a fast freezing apparatus, a plurality of superimposed refrigerating chambers, each including a plate and a loose cover overlying the plate and extending in all directions beyond the plate, the plate of one chamber overlying and spaced from the cover of the next lower chamber, means for directing a refrigerant in the space between the plate of one chamber and the cover of the next lower chamber to thereby contact the plate of one chamber and the cover of the next lower chamber, and guides for supporting the plate and thereby the cover of a particular chamber for movement laterally from normal position for loading and unloading.

4. A fast freezing apparatus comprising a plurality of chambers, each including an article supporting plate, a cover overlying and extending in all directions beyond the edge of the plate and supported by the material within the chamber, the chambers being in substantial vertical alignment with the cover of one chamber immediately underlying and spaced from the plate of the superimposed chamber, and means for directing a refrigerant between the cover and plate of immediately adjacent chambers, the cover of a particular chamber being formed to direct the flowing refrigerant beyond the edges of the plate.

5. A fast freezing apparatus comprising a plurality of chambers, each including an article supporting plate, a cover overlying and extending in all directions beyond the edge of the plate and supported by the material within the chamber, the chambers being in substantial vertical alignment with the cover of one chamber immediately underlying and spaced from the plate of the superimposed chamber, means for directing a refrigerant between the cover and plate of immediately adjacent chambers, the cover of a particular chamber being formed to direct the flowing refrigerant beyond the edges of the plate, and means for adjustably supporting the respective chambers for variable vertical spacing.

6. A fast freezing apparatus comprising a plurality of chambers, each including an article supporting plate, a cover overlying and extending in all directions beyond the edge of the plate and supported by the material within the chamber, the chambers being in substantial vertical alignment with the cover of one chamber immediately underlying and spaced from the plate of the superimposed chamber, means for directing a refrigerant between the cover and plate of immediately adjacent chambers, the cover of a particular chamber being formed to direct the flowing refrigerant beyond the edges of the plate, and guides for supporting the respective chambers to permit them to be moved out of vertical alignment for loading and unloading.

D. MACBRIDE.